United States Patent [19]

Nakazato et al.

[11] 4,185,547
[45] Jan. 29, 1980

[54] APPARATUS FOR MANUFACTURING READILY SOLUBLE GRANULAR SUBSTANCES FROM POWDERED MATERIALS

[75] Inventors: Motoyasu Nakazato; Akira Tokumaru, both of Tokorozawa; Toshitaka Kobayashi, Ogose; Akio Kamishima, Higashimurayama, all of Japan

[73] Assignee: Meiji Nyugyo Kabushiki Kaisha, Tokyo, Japan

[21] Appl. No.: 886,577

[22] Filed: Mar. 14, 1978

[30] Foreign Application Priority Data

Nov. 4, 1977 [JP] Japan .................. 52-132939

[51] Int. Cl.$^2$ .................. A23C 9/16; A23C 11/00; A23F 1/00
[52] U.S. Cl. .................. 99/453; 99/471; 99/475; 99/483; 99/536
[58] Field of Search .................. 99/452, 536, 471, 453, 99/475, 476, 481, 483, 473, 474; 426/506, 507, 511, 285, 453, 588

[56] References Cited

U.S. PATENT DOCUMENTS

| | | | |
|---|---|---|---|
| 1,214,526 | 2/1917 | Ellis | 99/475 |
| 1,626,805 | 5/1927 | Forrest | 99/471 |
| 2,746,375 | 5/1956 | Abbott et al. | 99/471 |
| 2,832,686 | 3/1958 | Louder et al. | 99/483 |
| 2,934,434 | 4/1960 | Hartman et al. | 426/453 |
| 3,042,526 | 7/1962 | Spiess, Jr. et al. | 426/285 |
| 3,313,629 | 4/1967 | Thompson et al. | 426/453 |
| 3,684,526 | 8/1972 | Lowery | 99/471 |
| 3,695,165 | 10/1972 | Sienkiewicz et al. | 99/471 |
| 3,966,975 | 6/1976 | Hansen et al. | 99/471 |

FOREIGN PATENT DOCUMENTS

713210  8/1954  United Kingdom .................. 99/483

Primary Examiner—Harvey C. Hornsby
Assistant Examiner—Timothy F. Simone
Attorney, Agent, or Firm—Wenderoth, Lind & Ponack

[57] ABSTRACT

An apparatus for manufacturing readily soluble granular substances from powdered materials such as, for example, coffee, milk and the like. The apparatus has a vertical outer hollow cylindrical body for allowing quantities of powdered material from a distributor to fall by gravity therethrough, and a vertical inner hollow cylindrical body of different length and diameter inside the outer cylindrical body. The two concentric cylindrical bodies partly overlap each other and define a circumferential gap therebetween extending along the overlapping portion. A pneumatic air supply is provided on the outer cylindrical body for introducing compressed air into the outer body and producing a whirling air stream in the gap so that the powdered material carried by the whirling air stream forms a thin, ring-like continuous curtain. Also, first and second steam supply means are provided in the inner body and at the bottom of outer body for blowing steam against the curtain-shaped powdered material in the gap from the inside and outside.

9 Claims, 4 Drawing Figures

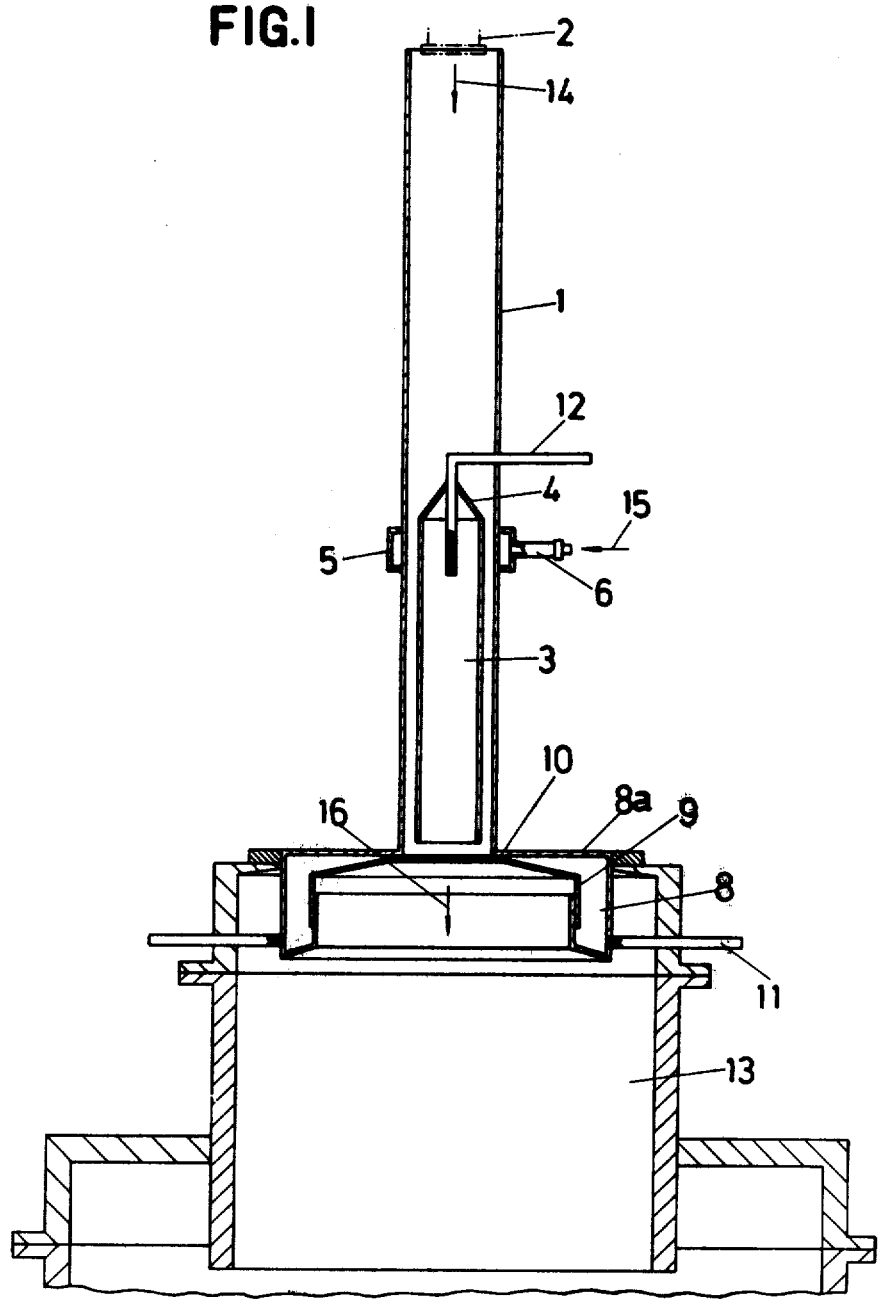

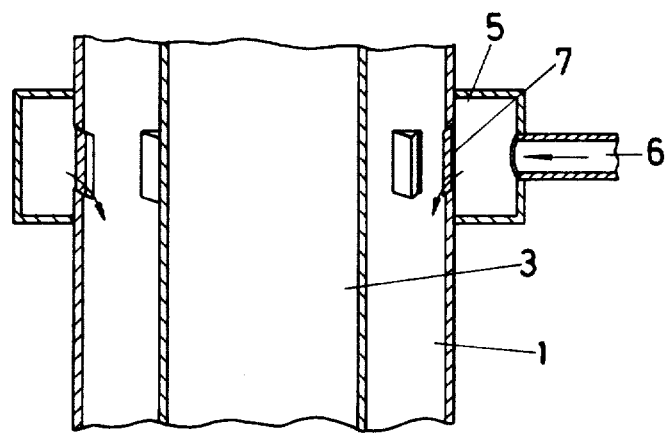
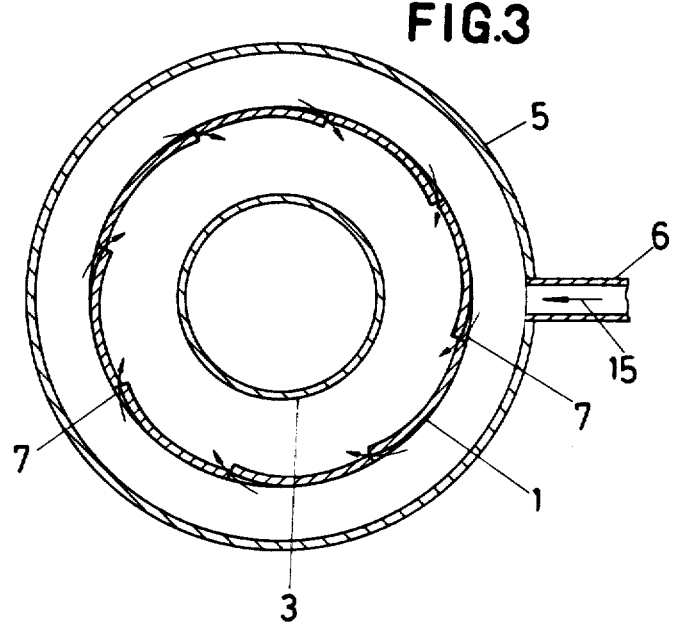

APPARATUS FOR MANUFACTURING READILY SOLUBLE GRANULAR SUBSTANCES FROM POWDERED MATERIALS

BACKGROUND OF THE INVENTION

1. Field of the Invention

The present invention relates generally to an apparatus for manufacturing readily soluble granular substances such as milk, coffee, seasoning and like products from powdered materials, and more particularly to an apparatus for manufacturing granules of uniform grain sizes with improved efficiency. The invention has two vertical outer and inner cylindrical bodies of different length and diameter arranged concentrically and spaced from each other for allowing quantities of powdered material to fall by gravity from a distributor through the space in the outer cylindrical body and through the circumferential gap between the two bodies in a thin, ring-like continuous curtain form. Pneumatic means on the outer cylindrical body produces a whirling stream of compressed air in the gap, and a first means on the closed top of the inner cylindrical body introduces a stream of steam into the inner body and blowing steam against the curtain-form powdered material from the inside. A second means at the open bottom of the outer body blows steam against the curtain-form material from the outside.

2. Description of the Prior Art

There are already known a number of apparatues for forming powdered materials into granules or granular substances under a humidified atmosphere, and those apparatuses employ a vibratory screening device or a pneumatic system as a distributor of the powdered materials. Distributing the powdered material by means of the vibratory screening device may disadvantageously cause the screening device to become clogged with the material if the material has a strong cohesive force between its particles. Furthermore, it is very likely that the material is distributed in gross or agglomerated sizes through the screening device, which makes it difficult to humidify those sizes of powders uniformly. An other disadvantage of the screening device is that the end products contain an increased amount of relatively fine granules. The pneumatic distribution system is disadvantageous in that a relatively long tubular passage is required to distribute quantities of powdered material in a uniform manner and yet it is difficult to obtain the uniform distribution of the material inside the tubular passage. A further disadvantage is that particles of the powder travel with great velocity through the passage, thereby lowering the efficiency of humidifying it and thus increasing the rate of production of the relatively fine granules.

SUMMARY OF THE INVENTION

Having the problems of the above-mentioned prior art in view, it is an object of the present invention to eliminate those problems. In order to accomplish this object, the present invention provides an improved apparatus for manufacturing readily soluble granules from powdered materials which essentially comprises two vertical outer and inner concentric tubular bodies of different length and diameter which partly overlap each other in such a manner as to define a circumferential gap therebetween. Thus, the powdered material from a distributor above travels down through the gap under the action of a whirling stream of compressed air which is produced in the gap by regularly-spaced slits provided tangently to the circumference of the outer tubular body, and forms a thin, ring-like continuous curtain. The apparatus further includes steam supply means which blow steam against the powdered material carried by the curtain shaped air stream from the inside and outside.

Another object of the present invention is to provide an improved apparatus of simple structure for manufacturing granules or granular substances of desired grain size range which can readily disperse in liquids such as water.

BRIEF DESCRIPTION OF THE DRAWINGS

Other objects, features and advantages of the present invention will be readily understood from the detailed description of the specification which follows hereinafter and the appended claims with reference to the accompanying drawings, in which:

FIG. 1 is a cross-sectional view of a preferred embodiment of the present invention;

FIG. 2 is an enlarged cross-sectional view of the pneumatic air introduction portion in the apparatus shown in FIG. 1;

FIG. 3 is an enlarged cross-sectional plan view of the portion in FIG. 2; and

DESCRIPTION OF THE PREFERRED EMBODIMENTS

Figure 4:
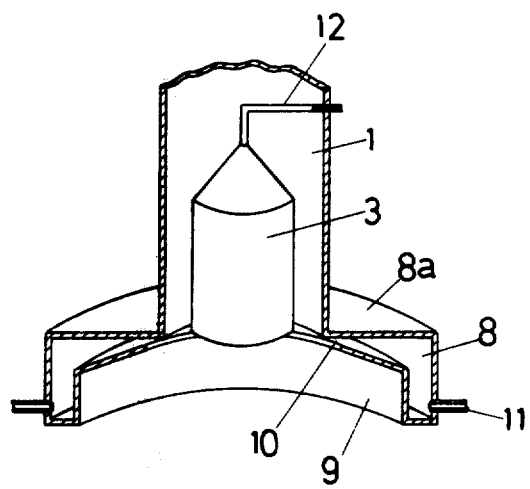
FIG. 4 is a perspective view of the portion in FIG. 2, illustrating the portion as partly broken away.

Granules or granular substances referred to herein and conveniently so termed, which are manufactured according to the present invention, can be defined as those which contain particles of a powder adhered together and have a property of being porous between the adhered particles, the size of each granule being in the range of 250$\mu$ to 2,380$\mu$.

Referring first to FIG. 1, the general construction of a preferred embodiment of the invention is shown and is now described in more detail. A vertical outer hollow cylindrical body 1 has at the top thereof, a distributor or feeder 2 for feeding given quantities of powdered material into the outer cylindrical body 1. A vertical inner hollow cylindrical body 3 is smaller in length and diameter than the outer body 1, the length being such that it can be installed concentrically inside the outer body 1 with its upper end positioned in the middle of the outer body 1 and its lower end located a little higher than or withdrawn from the corresponding lower end of the outer body 1. The diameter of the inner body 3 is in the order of two-thirds of that of the outer body 1 so that a circumferential gap is defined between and along the outer and inner bodies 1 and 3 when the inner body 3 is mounted inside the outer body 1. The inner body 3 is equipped with a substantially conical end cap or cover 4 at the top thereof. As can be readily seen from the above-described arrangement of the outer and inner bodies 1 and 3, the outer body 1 has an upper half portion and a lower half portion on the inside thereof. The lower half portion is defined by the two overlapping bodies 1 and 3 with the circumferential gap therebetween. In the overlapping portion, there is a circular duct 5 which is mounted around the circumferential wall of the outer body 1 and which is located at the upper portion of the overlapping portion as shown. A pipe 6 extends from the circular duct 5 and introduces a stream of compressed air from a supply source not shown into the circular duct 5. The wall portion of the outer body 1 covered by the circular duct 5 has a number of regularly spaced slits 7, 7 which are cut tangentially to the circumferential wall of the outer body 1 to a stream of compressed air from the duct 5 to be introduced into the outer body 1 therethrough. The lower end of the outer body 1 is open and is connected integrally to a top plate 8a of a casing 8 which is diameterically greater than the outer body 1. A frustoconical or truncated cone-shaped guide member 9 is provided inside the casing 8 in such a manner that a circumferential slit or gap 10 is defined between the lower edge of the outer body 1 and the upper edge of the guide member 9 for allowing a stream of steam to pass therethrough. As particularly shown in FIGS. 1 and 4, the casing 8 has a steam passage chamber therein enclosed by the casing wall portion and the guide member 9, and by a central opening portion open below the guide member 9.

Steam supply pipes 11 extend from the lower portion of the casing 8 for introducing a stream of steam from a steam supply source (not shown) into the steam passage chamber. As shown in FIGS. 1 and 4, an additional, steam supply pipe 12 provided through the outer body 1, extends through the conical cover 4 into the inner body 3. A container or receptacle 13 receives the granulated products which fall from the outlet of the casing 8.

The operation of the apparatus illustrated heretofore is as follows. In FIG. 1, a given quantity of powdered material is fed from the distributor 2 into the outer cylindrical body 1 in the direction of arrow 14 and falls by gravity in a dispersing or scattering manner through the space in the upper half portion of the outer body 1. It should be understood that the distribution of powdered material by the distributor 2 is done in such a manner that the material is fed as a constant, continuous flow. In the meantime, a stream of pneumatic or compressed air is supplied through the pneumatic supply pipe 6 in the direction of arrow 15 into the outer body 1 into the gap between the outer and inner bodies. Since the slits 7, 7 are provided in the outer body 1, when compressed air is introduced through the slits into the outer body 1, the air becomes a turning or whirling stream of air in the gap. In the gap, the falling powdered material is then involved in the whirling stream of air and falls in the whirling motion. In more detail, the powdered material falling by gravity through the upper half space of the outer body 1 reaches the point of the conical-shaped cap 4, which in turn introduces the powdered material into the circumferential gap between the two bodies 1 and 3. Travelling through the gap, most of the material is brought close to the outside (toward the inner wall of the outer body) by the centrifugal action of the whirling air stream, and travels down in a thin, circular continuous curtain form along the inner wall of the outer body 1.

At the lower end of the outer body 1, a stream of steam is introduced through the steam slit 10 and is blown at right angles to and against the whirling air stream carrying the powdered material at the point of the air stream's passage from the lower end of the outer body 1 to the guide member 9. At the same time a stream of steam from the steam supply pipe 12 is blown out of the lower open end of the inner body 3 against the whirling air stream or powdered material carried thereby from the inside. As readily understood from the above, the powdered material carried by the whirling air stream forming the thin, ring-shaped continuous curtain has steam blown to both sides, i.e., inside and outside, of the curtain-like flow so that the material can be humidified on both sides thereof. Thus, the powdered material is granulated or formed into granules of uniform grain sizes which are finally directed in the direction of the arrow 16 into the receptacle 13.

The table below shows the results which have been obtained with regard to three kinds of powdered materials which have been processed for granulation according to the present invention.

| Conditions | Materials | Instant creaming powder | Whole milk powder | Granulated sugar (finely ground) |
|---|---|---|---|---|
| Processing Conditions | | | | |
| Rate of Material Supply (kg/hr) | | 300 | 300 | 200 |
| Rate of Steam Supply (kg/hr) | | 30 | 25 | 15 |
| Rate of Compressed Air Supply (m³/hr) | | 10 | 8 | 5 |
| Characteristics of Products | | | | |
| Grain Sizes (%): U/M μ | | | | |
| 2,380 or more | | 5 to 15 | 5 to 15 | 5 to 15 |
| 2,380–1,000 | | 10 to 20 | 5 to 15 | 15 to 20 |
| 1,000–500 | | 20 to 25 | 25 to 35 | 20 to 35 |
| 500–250 | | 15 to 25 | 20 to 25 | 10 to 20 |
| 250 or less | | 10 to 20 | 5 to 15 | 10 to 20 |
| Solubility in water | | Excellent | Excellent | Excellent |
| Sinkability in water | | Excellent | Good | Excellent |

As shown in the table, it has been found that granules processed by the present invention having a size no greater than 250μ make up only 20% or less of the whole granule distribution. However, it is commonly observed that the percentage of such smaller granules reaches as high as 30% the process is conducted in the earlier mentioned conventional apparatus. From this finding, it can be said that the present invention is advantageous over the prior art in that the product obtained according to the invention contains a smaller percentage of grain sizes of less than 250μ.

The construction and operation of the apparatus have been described, and in addition to the advantages mentioned earlier, the present invention is advantageous with respect to its uniform humidifying capability, its improved humidifying efficiency and its more compact construction. Those advantages are derived from the particular construction of the apparatus, which includes the two concentric outer and inner cylindrical structures of different length and diameter, the circumferential gap between the overlapping structures, the compressed air supply means for producing a whirling air stream in the gap and causing the powdered material flow to travel down in the thin, ring-shaped continuous curtain form through the flowing gap, and the steam supply means for blowing steam against the curtain-form powdered material flow from both the inside and outside.

Although the invention has been described with reference to the preferred embodiments thereof, it should be understood that various changes and modifications may be made without departing from the spirit and scope of the invention.

What is claimed is:

1. An apparatus for producing readily soluble granular substances from powdered materials, said apparatus comprising:

a vertical outer hollow cylindrical casing open at the top thereof and adapted to receive said powdered materials through said top opening;

a vertical inner hollow cylindrical casing having a lesser diameter than and being shorter than said outer casing, said inner casing being closed at the top thereof, open at the bottom thereof, and concentrically positioned within said outer casing at the lower portion thereof, the difference in diameters of said inner and outer casings forming a gap between both of said casings;

pneumatic air supply means connected through said outer casing for introducing compressed air into said outer casing substantially tangential to the inner surface thereof, whereby a whirling air stream is produced along the inner surface of said outer casing;

first steam supply means connected to said inner casing for introducing a stream of steam thereinto; and second steam supply means surrounding the lower end of said outer casing for supplying steam into said outer casing opposite the lower end of said inner casing.

2. An apparatus as claimed in claim 1, wherein said pneumatic air supply means is comprised of:

regularly spaced air slits tangently formed on the circumferential wall of said outer casing at the upper portion of said gap between said inner and outer casings;

a circular duct surrounding said slits on the outside of said outer casing; and an air supply pipe extending from said circular duct and adapted to be connected to a compressed air supply for introducing compressed air into said circular duct.

3. An apparatus as claimed in claim 1, wherein said inner casing is positioned within the lower half of said outer casing and the lower edge of said inner casing is withdrawn relative to the corresponding lower edge of said outer casing.

4. An apparatus as claimed in claim 1, wherein:

said inner casing has a conical cap covering the top thereof; and said first steam supply means extends through said cap into said inner casing.

5. An apparatus as claimed in claim 4, wherein said first steam supply means is comprised of a steam supply pipe through said cap.

6. An apparatus as claimed in claim 1, wherein said second steam supply means is comprised of:

a truncated cone-shaped guide member below the lower end of said outer casing, said cone-shaped guide member having a central opening therethrough substantially aligned with said outer casing;

an enclosing member extending from the lower end of said outer casing around the bottom of said cone-shaped guide member, the lower edge of said outer casing and the upper edge of said cone-shaped guide member forming a circumferential slit thereinbetween; and steam supply means attached to said enclosing member and adapted to be connected to a steam source for introducing steam into said enclosing member, whereby steam inside said enclosing member is forced outward through said slit between said guide member and the lower edge of said outer casing.

7. An apparatus as claimed in claim 6, wherein:

said outer casing is open at the bottom; and a collecting container means is positioned below said guide member for collecting powered material falling from said outer casing through said opening in said guide member.

8. An apparatus as defined in claim 1, wherein said powdered material is a fine particle powder.

9. An apparatus as defined in claim 1, wherein said granular substances each have the property of being porous between their adhered particles and have the grain size range of between $250\mu$ to $2,380\mu$.

* * * * *